US008769301B2

(12) United States Patent
Shang

(10) Patent No.: US 8,769,301 B2
(45) Date of Patent: Jul. 1, 2014

(54) PRODUCT AUTHENTICATION BASED UPON A HYPERELLIPTIC CURVE EQUATION AND A CURVE PAIRING FUNCTION

(75) Inventor: Ning Shang, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 13/193,575

(22) Filed: Jul. 28, 2011

(65) Prior Publication Data

US 2013/0031373 A1   Jan. 31, 2013

(51) Int. Cl.
*G06F 11/30* (2006.01)
*G06F 7/04* (2006.01)
*G06F 21/10* (2013.01)

(52) U.S. Cl.
CPC .................................... *G06F 21/10* (2013.01)
USPC ............................................. 713/189; 726/16

(58) Field of Classification Search
CPC ..................................................... G06F 21/10
USPC ........................................................ 713/189
See application file for complete search history.

(56) References Cited

U.S. PATENT DOCUMENTS

| 5,737,424 | A | 4/1998 | Elteto et al. | |
|---|---|---|---|---|
| 6,163,841 | A | 12/2000 | Venkatesan et al. | |
| 7,020,776 | B2 | 3/2006 | Lauter et al. | |
| 7,043,015 | B2 | 5/2006 | Lauter et al. | |
| 7,730,315 | B2 | 6/2010 | Lauter et al. | |
| 2002/0018560 | A1* | 2/2002 | Lauter et al. | 380/28 |
| 2004/0044739 | A1* | 3/2004 | Ziegler | 709/213 |
| 2004/0123110 | A1* | 6/2004 | Zhang et al. | 713/176 |
| 2006/0064349 | A1* | 3/2006 | Multerer et al. | 705/14 |
| 2007/0076865 | A1* | 4/2007 | Lauter et al. | 380/30 |
| 2007/0192397 | A1* | 8/2007 | Lauter et al. | 708/523 |
| 2007/0228179 | A1* | 10/2007 | Atkinson | 235/487 |
| 2009/0180612 | A1* | 7/2009 | Leu et al. | 380/200 |
| 2011/0296175 | A1* | 12/2011 | Shin | 713/164 |

OTHER PUBLICATIONS

Balakrishnan et al., "Pairings on Hyperelliptic Curves", 2009.
Boneh et al., "Short Signatures from the Well Pairing"., in ASIACRYPT '01: Proceedings of the 7th International Conference on the Theory and Application of Cryptology and Information Security,pp. 514-532, 2001.
Ganesan, Prasanna, "An Authentication Protocol for Mobile Devices Using Hyperelliptic Curve Cryptography", International J. of Recent Trends in Engineering and Technology, vol. 3, No. 2, May 2010.
Koblitz, Neal, "Hyperelliptic Cryptosystems". Journal of Cryptology, Department of Mathematics GN-50, University of Washington, Seattle, Wa 98195, U.S.A., 1: 139-150,(1989).
Shang, Ning, "Low Genus Algebraic Curves in Cryptography", PhD thesis, Purdue University West Lafayette, Indiana, May 2009.
International Search Report and Written Opinion—PCT/US2012/048896—ISA/EPO—Jan. 22, 2013.

* cited by examiner

*Primary Examiner* — Techane Gergiso
(74) *Attorney, Agent, or Firm* — Won Tae Kim

(57) ABSTRACT

Disclosed is a method, system, and device to authenticate a product. A plurality of public parameters and a secret master key are selected. The public parameters include a hyperelliptic curve equation and a curve pairing function. A public product activation code and a private product activation code are generated based upon the public parameters and the secret master key. The public parameters and the public product activation code are stored with the product. Further, the private product activation code is associated with the product. The product is authenticated if the private product activation code entered to a client device satisfies a mathematical formula implemented with the public parameters and the public product activation code.

37 Claims, 4 Drawing Sheets

PRODUCT AUTHENTICATION BASED UPON A HYPERELLIPTIC CURVE EQUATION AND A CURVE PAIRING FUNCTION

BACKGROUND

1. Field

The present invention relates to product authentication based upon a hyperelliptic curve equation and a curve pairing function.

2. Relevant Background

Computing devices are routinely used at work, at home, and everywhere else. Computing devices advantageously enable electronic communication, data sharing (e.g., documents, pictures, music, film, multimedia, etc.), the use of application-specific software, access to information for electronic commerce through the Internet and other computing networks. The term computing device generally refers to desktop computers, server computers, laptop computers, mobile computing devices (e.g., personal digital assistant (PDA), smart phones, tablet computers, cellular phones, etc.), as well as any other type of computer system.

Application software may be utilized by computing devices to implement a wide variety of different types of functions. Application software may be purchased from a vendor and installed on a computing device by storage media (e.g. a compact disk (CD)) or may be downloaded wirelessly or through the Internet for installation on the computing device. However, security and authentication for the purchase and use of such application software has become increasingly important to application software developers.

One manner in which these concerns have been addressed is by the use of cryptographic techniques involving a key-based cipher. Using a key-based cipher, sequences of intelligible data (typically referred to as plaintext) that collectively form a message are mathematically transformed, through an enciphering process, into seemingly unintelligible data (typically referred to as ciphertext). The enciphering can be reversed, allowing recipients of the ciphertext with the appropriate key to transform the ciphertext back to plaintext, while making it difficult for those without the appropriate key to recover the plaintext.

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a plaintext message using encryption to a receiving party, an originating party encrypts the plaintext message into a ciphertext message using the public key of the receiving party and communicates the ciphertext message to the receiving party. Upon receipt of the ciphertext message, the receiving party decrypts the message using its secret private key, and thereby recovers the original plaintext message.

One area for the use of cryptographic techniques is product authentication. Product authentication can be required anywhere a party or a machine must prove that it is authorized to access or use a product or service. An example of such a situation is in a product ID system for a software program(s), where a user must hand-enter a product ID sequence stamped on the outside of the properly licensed software package as proof that the software has been properly paid for. If the product ID sequence is too long, then it will be cumbersome and not user friendly.

Thus, the product ID sequence (termed hereinafter product activation code) is a sequence of symbols which can be printed outside the container of a software, firmware, or hardware product, or delivered via other means (such as downloaded via the Internet or wirelessly), which needs to be entered by the end user by hand such the product performs subsequent operations to authenticate the product. A production activation code authenticates the product and is useful for protecting the product from unauthorized use and piracy.

However, prior "secret" cryptographic algorithms that have been used in the past, as previously described, may be easily discovered, reversed engineered, and can be broken such that these types of secret algorithms are intrinsically weak. Further, product activation codes that are currently used with these secret algorithms typically require relatively large product activation codes (e.g., often over 30 key strokes). Therefore, techniques are sought after to implement very strong authentication procedures with relatively small product activation codes.

SUMMARY

Aspects of the invention may relate to a method, system, and device to authenticate a product. A plurality of public parameters and a secret master key are selected. The public parameters include a hyperelliptic curve equation and a curve pairing function. A public product activation code and a private product activation code are generated based upon the public parameters and the secret master key. The public parameters and the public product activation code are stored with the product. Further, the private product activation code is associated with the product. The product is authenticated if the private product activation code entered to a client device satisfies a mathematical formula implemented with the public parameters and the public product activation code.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Aspects of the invention relate to a relatively short (e.g., thirteen key stroke) private product activation code that authenticates a software product and is useful for protecting the software product from unauthorized use and piracy. The use of a short software private product activation code eases the manual process of entering the software product activation code by a user. In one aspect, the software product may be authenticated if the private product activation code entered to a client device by a user satisfies a mathematical formula implemented with public parameters including a hyperelliptic curve equation and a curve pairing function, and a public product activation code.

Aspects of the invention may relate to a method, system, and device to authenticate a product. A plurality of public parameters and a secret master key are selected. The public parameters include a hyperelliptic curve equation and a curve pairing function. A public product activation code and a private product activation code are generated based upon the public parameters and the secret master key. The public parameters and the public product activation code are stored with the product. Further, the private product activation code is associated with the product. The product is authenticated if the private product activation code entered to a client device satisfies a mathematical formula implemented with the public parameters and the public product activation code.

Figure 1:
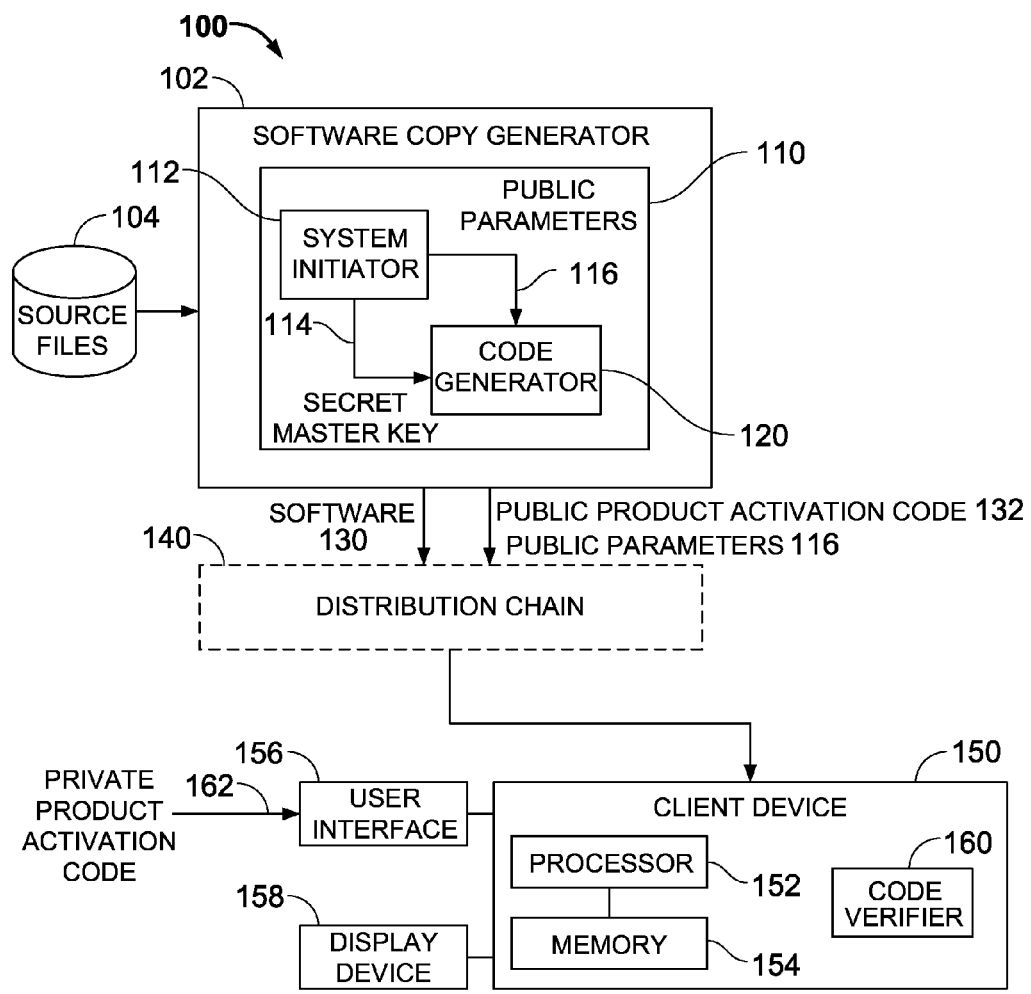
FIG. 1 is a block diagram of a system in which aspects of the invention may be practiced.

With reference to FIG. 1, FIG. 1 is a block diagram of a system 100 in which aspects of the invention may be practiced. In particular, system 100 includes a software copy generator 102, a distribution chain 140, and a client device 150. Software copy generator 102 includes a product authenticator 110. Software copy generator 102 produces software products 130 (e.g., a CD-ROM, DVD, flash memory, etc.) that contain typically all the files needed to collectively implement a complete copy of one or more application programs (e.g., a word processing program, a spreadsheet program, an operating system, a suite of programs, application-specific programs, etc.). These files are received from source files 104, which may be a local source (e.g., a hard drive internal to generator 102) or a remote source (e.g., coupled to a generator 102 via a network or a combination thereof). It should be appreciated that the software product 130 may be transmitted wirelessly, via the Internet, or by other network means, to the client device. It should also be appreciated that although product 130 is described as a software product 130 that the product 130 can be any type of product: hardware, firmware, middleware, applications, programs, etc.

Product authenticator 110 generates a private product activation code 162 that may include numbers, letters, and/or other symbols. Further, product authenticator 110 generates a public product activation code 132 and public parameters 116 that are also distributed through a distribution chain 140 to the client device 150.

In particular, according to one aspect of the invention, the product authenticator 110 comprises a system initiator 112 that generates a secret master key 114 and public parameters 116 that are transmitted to the code generator 120. The public parameters 116 include a hyperelliptic curve equation and a curve pairing function. Additionally, the product authenticator 110 includes a code generator 120 that: generates a public product activation code 132 and a private product activation code 162 based upon the public parameters 116 and the secret master key 114. The code generator 120 stores the public parameters 116 and the public product activation code 132 with the software product 120 and associates the private product activation code 162 with the software product.

Figure 2:
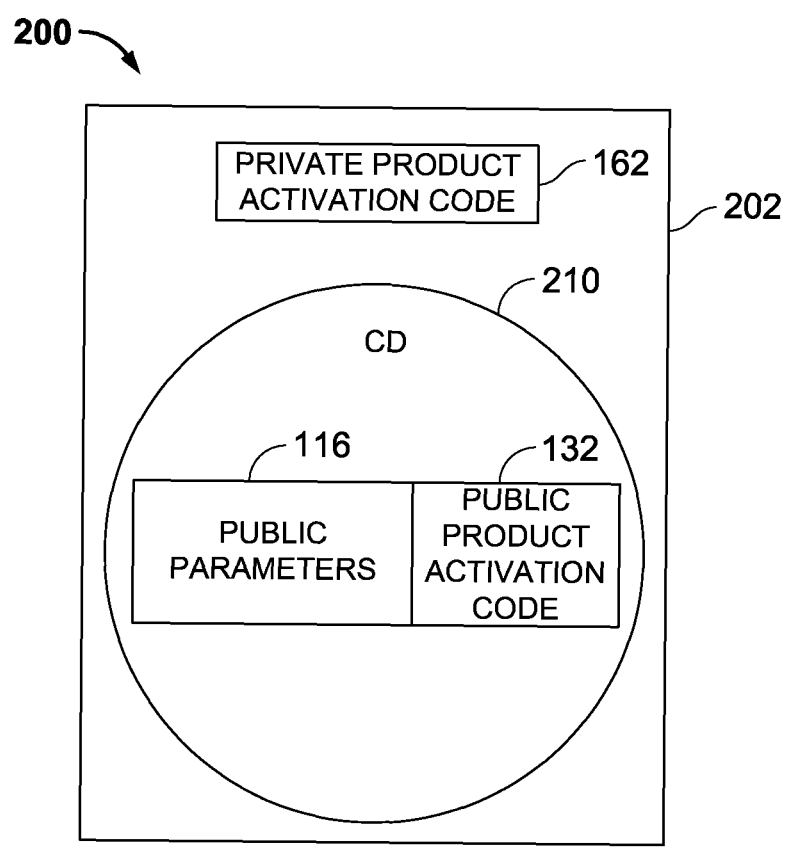
FIG. 2 is a diagram showing a software product including public parameters and a public product activation code stored with the software product.

As an example, with brief reference to FIG. 2, the public parameters 116 and the public product activation code 132 may be stored with a software product 200 (e.g., stored to a CD 210). The private product activation code 162 associated with the software product 210 may be displayed with the purchased product on the packaging 202.

Also, referring back to FIG. 1, it should be appreciated that the private product activation code 162, the public product activation code 132, the public parameters 116, and the software product 130 may be transmitted wirelessly or via the Internet to the client device 150. Further, there are many other network means by which the software 130, the public parameters 116, the public product activation code 132, and the private activation code 162 may be transmitted to the client device 150. It should also be appreciated that although product 130 is described as a software product 130 that the product 130 can be any type of product: hardware, firmware, middleware, applications, programs, etc.

In one aspect, the software product 130, public parameters 116, public product activation code 132, and private product activation code 162 may be provided through a distribution chain 140. Distribution chain 140 represents any of a variety of conventional distribution systems and methods, including possibly one or more "middle men" (e.g., wholesalers, suppliers, distributors, retail stores (either on-line or brick and mortar), etc.). For example distribution chain 140 may include the purchase of a software CD from a store or the software may be downloaded from the Internet or wirelessly. Regardless of the manner in which the software product 130 and the associated public parameters 116, public product activation code 132, and private product activation code 162 are distributed, eventually, the software product 130 is purchased/licensed by the user of the client device 150.

Client device 150 includes a code verifier 160 that authenticates the software product 130, if the private product activation code 162 entered by a user satisfies a mathematical formula implemented with the public parameters 116 and the public product activation code 132, as will be hereinafter described. Client device 150 may include a display device 158, a user interface 156, a processor 152 and memory 154. Display device 158 may be a typical display device for a client device 150. Client device 150 may be a personal computer, laptop computer, server computer, personal digital assistant, cell phone, smart phone, mobile device, tablet, or any type of computing device. User interface 156 may be a keypad, keyboard or another type of user input device, typically used with a client device 150.

In one aspect, client device 150 may include processor 152 and memory 154 configured to read and execute instructions for: reading a public product activation code 132 and public parameters 116 from a software product 130; and for implementing a code verifier 160 to authenticate the software product 130 if the private product activation code 162 entered by a user satisfies a mathematical formula implemented with the public parameters 116 and the public product activation code 132, as will be described in more detail hereinafter. Code verifier 160 may be an implementable software, middleware, or firmware module.

Client device 150 may read the software program 130 from memory 154 and may install the software program 130 if the code verifier 160 authenticates the product based upon the inputted private activation code 162 by a user. Therefore, part of the installation process involves entry of the private product activation code 162 by a user. This entry may be a manual entry (e.g., the user typing in the private product activation code 162 via the user interface 156), or, alternatively, an automatic entry (e.g., client device 150 automatically accesses a particular field with a license associated with the software program 130 and extracts the private product activation code 162 therefrom). Therefore, after the code verifier 160 of the client device 150 validates the private activation code 162, the client device may install the software program 130.

Accordingly, if the code verifier 160 determines that the private product activation code 162 is valid, then an appropriate course of action is taken (e.g., an installation program of the software application program 130 allows the application to be installed on the client device 150). However, if the code verifier 160 determines that the private product activation code 162 is invalid, then a different course of action is taken (e.g., the installation program terminates the installation process preventing the software application program 130 from being installed).

Various examples will be hereinafter discussed. In one aspect, the product may be a software product purchased by a user or provided to a user (e.g., licensed) and the private product activation code 162 may be displayed to the user. As one example, the software product 130 and the private product activation code 162 may be transmitted (e.g. wired or wirelessly) to the user (e.g., over the Internet from a web-site) and the private authentication code 162 may be displayed to the user on the display device 158 to the user such that the user may enter it. As another example, the software product 130 may be a storage media product (e.g. a CD, disk, flash memory, etc.) that stores a software product that is purchased or provided to a user (e.g., licensed) and the private product activation code 162 may be displayed in packaging associated with the storage media product (e.g., see FIG. 2). It should be appreciated that the product may not only be software but other products such as hardware, firmware, middleware, applications, programs, etc.

In one aspect, the hyperelliptic curve equation is determined such that an efficiently computable curve pairing function is defined for the Jacobian of the curve. The secret master key 114 may be randomly chosen. The random number for the secret master key 114 can be chosen between 1 and $2^N$, where N is the desired symmetric-key equivalent security level. As an example, the random number for the secret master key 114 may be a number between 1 and $2^{64}$. As one particular example of the hyperelliptic curve equation, the hyperelliptic curve equation may be of the form—C: $y^2+h(x)y=f(x)$ over a finite field $F_q$ in which C is chosen such that there is a pairing function: e: $G_1 \times G_2 \rightarrow G_T$ with $G_1$ and $G_2$ being a subgroup of Jac(C, $F_q$) or a quotient group of Jac(C, $F_q$). It should be appreciated that by utilizing this type of equation the private product activation code 162 may be chosen a priori as an encoding of information of N bits, and the public product activation code 132 may be derived from the private product activation code 162 as an encoding of information of 2N bits, wherein the level of security provided by the method is equivalent to an N-bit symmetric key. As one example, the private product activation code 162 may be a reduced activation code (e.g., thirteen keystroke entries) to achieve at least 64-bit symmetric-key equivalent security, with the symbols [A-Z0-9] or a subset of them used as the input alphabet.

Figure 3:
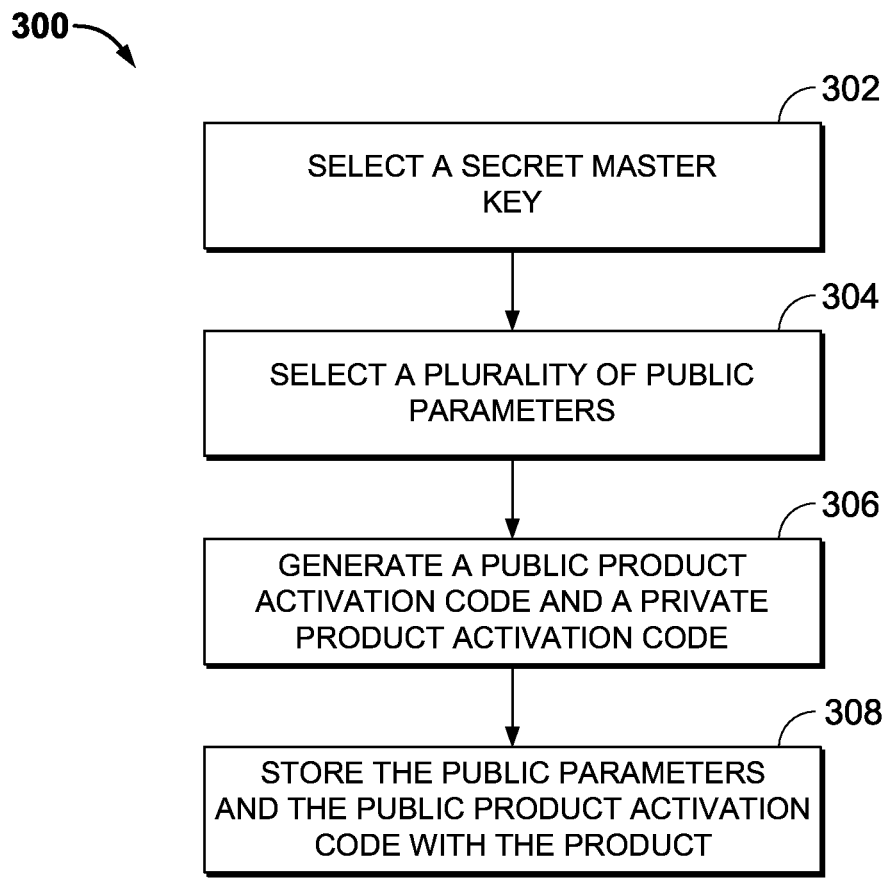
FIG. 3 is a flow diagram to illustrate a process to authenticate a software product.

With brief reference to FIG. 3, a flow diagram is shown to illustrate a process 300 to authenticate a software product 130. At block 302, a secret master key 114 is selected. At block 304, a plurality of public parameters are selected including a hyperelliptic curve equation and a curve pairing function. Next, a public product activation code 132 and a private product activation code 162 are generated (block 306). These activation codes are based upon the public parameters and the secret master key. At block 308, the public parameters 116 and the public product activation code 132 are stored with the software product 130. Further, private product activation 162 is associated with the software product 130.

Figure 4:
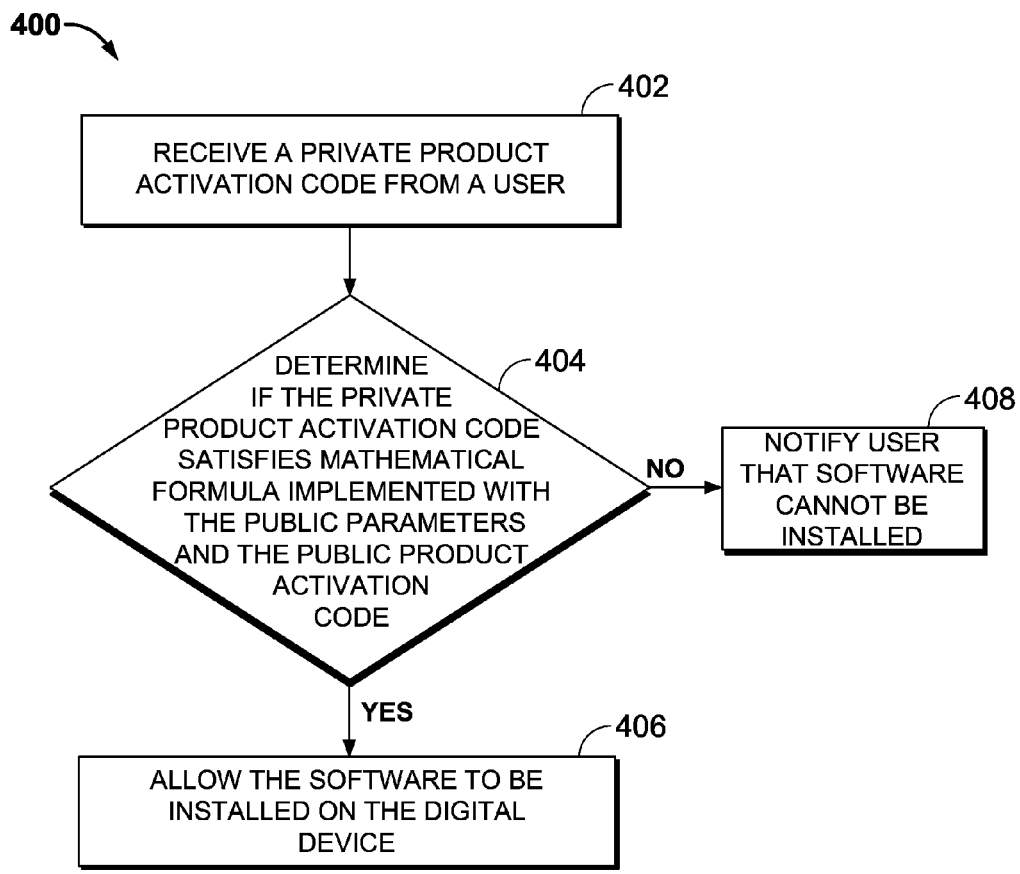
FIG. 4 is a flow diagram to illustrate a process to allow a software product to be installed on a client device

With brief reference to FIG. 4, a flow diagram is shown to illustrate a process 400 to allow the software product 130 to be installed on the client device 150. At block 402, a private product activation code 162 is received from the user at the client device 150. Next, at decision block 404, client device 150 determines if the private product activation code 162 satisfies a mathematical formula implemented with the public parameters 116 and public product activation code 132. If not, a software product 130 is not installed and the user is notified that the software cannot be installed (block 408). However, if the private product activation code 162 is authenticated, then the software product 130 is installed on the client device (block 406).

Thus, according to aspects of the invention, three main components may be utilized to authenticate a software product 130: 1) system initiator 122—system initiator 122 may be a module that generates system parameters that will be used by the other modules for product activation code creation and verification; 2) code generator 120—code generator 120 may be a module that creates the private product activation code 162 to be entered by an end user and corresponding information/data (e.g., public product activation code 132) to be embedded in the software product 130 for activation code verification purposes; and 3) code verifier 160: code verifier 160 may be a module that is part of the software product 130 implemented by the processor 152 of the client device 150 that takes the manually entered private product activation code 162 as input and then authenticates the software product 130.

As an example, the following equations and operations at the system initiator 112 may be utilized:

1. For the system initiator 112, given the desired level of security, a genus 2 curve (e.g., hyperelliptic curve equation) may be chosen:

$$C: y^2+h(x)y=f(x);$$

over a finite field $F_q$ such that f(x) is a degree 5 polynomial defined over the finite field $F_q$ of q elements, and deg(h)≤2. C is also chosen such that there is a pairing function:

$$e: G_1 \times G_2 \rightarrow G_T;$$

with $G_1$ being a subgroup of Jac(C, $F_q$), $G_2$ being a subgroup or a quotient group of Jac(C, $F_q$) or generally a group of some form that is related to Jac(C, $F_q$), $G_T$ being a subgroup of $(F_q^k)^x$, the multiplicative group of the finite field $F_q^k$ where the embedding degree k is small, and $|G_1|=|G_2|=|G_T|=r$ being a prime number, and such that the value $\rho=2 \log(q)/\log(r) \approx 1$.

2. Randomly choose an element $P_2$ in $G_2$ such that $P_2$ is not the identity of $G_2$.

3. Randomly choose an integer 1<a<r, and compute another element $Q_2=[a]P_2$ in $G_2$.

Also compute $b=a^{-1}$ (mod r). Because r is a prime number, b, as the multiplicative inverse of a modulo r, always exists and is effectively computable.

4. Let the system public parameters 116 be a tuple Param= (q, C, e(•, •), $P_2$, $Q_2$), and the secret key 114 for the code generator 120 be a, b. System initiator 112 provides the secret key 114 and the system public parameters 116 including the hyperelliptic curve equation and the curve pairing function to code generator 120.

As an example, for code generator 120 operations:

1. A random element is chosen: $x_0 \in F_q$ such that $P_1=(x-x_0, y_0)$ is a degree one divisor on the Jacobian of C, and that $P_1$ is in the subgroup $G_1$. This can be done in the following way: $x_0$ is chosen at random from $F_q$, then set $x=x_0$ in the curve equation, and solve a quadratic equation for $y=y_0 \in F_q$. Verify whether the divisor $(x-x_0, y_0)$ has order r or not. If a solution $y=y_0$ does not exist or the order of the resulting divisor is not r, then another value for $x_0$ is chosen. With $\rho \approx 1$, there is a high probability that such a $P_1$ will be found.

2. A representation of $x_0$ is chosen that is approximately log(q)-bit long. As there are two possible solutions for $y=y_0$ in the last step, one more bit is used to represent the chosen solution. Convert the representation of $x_0$ and the added one bit into a sequence of printable symbols, with respect to any lossless encoding. For example, if q is 80-bit, and the ASCII characters A-Z, a-z, and 0-9 are used as possible symbols, then the length of the encoded sequence is about 14. Use this sequence of symbols as the private product activation code 162, which may be delivered to the end user in printable or electronic format (as previously described).

3. Compute another element $Q_1=[b]P_1 \epsilon G_1 \subseteq \text{Jac}(C, F_q)$.

4. Further, let M be a representation of $Q_1$. M may then be used as a public product activation code 132 with is embedded in the software product 130, together with the public system parameters 116. Note that the product can also be signed to make sure that these embedded values will not be tampered with.

As an example, for code verifier 160 operations:

1. Define the private product activation code 162 entered by the user as M'. Decode M' as $x_0$ and an additional bit denoting the choice of one of the two solutions for $y=y_0$. If no $y_0$ exists for this $x_0$, reject the private product activation code 162. Otherwise reconstruct a degree one divisor $\overline{P}_1=(x-x_0, y_0)$ from the decoded value.

2. Check whether $\overline{P}_1$ has order r. If the order of $\overline{P}_1$ is not r, then reject the private product activation code 162 code. Otherwise, go to the next step (3).

3. Reconstruct the element $Q_1$ from M.

4. Compute $u=e(P_1, P_2)$. Compute $v=e(Q_1,Q_2)$.

5. If $u=v$, then product authentication succeeds and the software may be installed; otherwise, the authentication fails, and the subsequent operations (i.e., the installation of the software product) is not performed. Thus, the code verifier 160 authenticates the product if the private product activation code 162 satisfies a mathematical function or algorithm (as previously described in steps 1-5) implemented with the public parameters and the public product activation code, in which, the public parameters include a hyperelliptic curve equation and a curve pairing function.

By using the previously described method of utilizing hyperelliptic curve pairings it has been found that a high level of security is provided with a private product activation code 162 that is generally half the size of other previously utilized activation codes that utilize other methods.

As one example, the private product activation code 162 may be a reduced activation code that may include approximately thirteen keystroke entries such that it is relatively small compared to presently utilized activation codes.

The teachings herein may be incorporated into (e.g., implemented within or performed by) a variety of apparatuses (e.g., devices). For example, one or more aspects taught herein may be incorporated into a wireless device, a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer (e.g., personal computer, server computer, laptop computer, etc.), mobile device, smart phone, tablet, a point-of-sale device, an entertainment device, a hearing aid, a set-top box, or any other suitable device.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, middleware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

In one or more exemplary embodiments, the functions described may be implemented in hardware, software, middleware, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to authenticate a product comprising:
   selecting a secret master key and a plurality of public parameters including a hyperelliptic curve equation and a curve pairing function, wherein the hyperelliptic curve equation is over a finite field and is chosen such that the curve pairing function is of the form $G_1 \times G_2 \rightarrow G_T$ with $G_1$ and $G_2$ being related to the Jac(hyperelliptic curve equation, finite field) and $G_T$ being related to the finite field;
   generating a public product activation code and a private product activation code based upon the public parameters and the secret master key, wherein the private product activation code is chosen a priori as an encoding of information of N bits, and the public product activation code is derived from the private product activation code;
   storing the public parameters and the public product activation code with the product;
   associating the private product activation code with the product; and
   authenticating the product if the private product activation code entered satisfies a mathematical formula implemented with the public parameters including the hyperelliptic curve equation and the curve pairing function and the public product activation code, wherein the curve pairing function is not secret.

2. The method of claim 1, wherein the product is a software product purchased by a user or provided to the user and the private product activation code is provided to the user.

3. The method of claim 1, wherein the product is a software product and the software product and the private product activation code are transmitted to a user.

4. The method of claim 1, wherein the product is a storage media product that stores software that is purchased or provided to a user and the private product activation code is displayed in packaging associated with the storage media product.

5. The method of claim 1, wherein the private product activation code is a reduced activation code.

6. The method of claim 1, wherein the hyperelliptic curve equation is determined such that an efficiently computable curve pairing function is defined for the Jacobian of the curve.

7. The method of claim 1, wherein the secret master key is a randomly chosen number.

8. The method of claim 1, wherein the public product activation code is an encoding of information of 2N bits, where the level of security provided by the method is equivalent to an N-bit symmetric key.

9. A non-transitory computer-readable storage medium to store code executable by a computer to authenticate a product comprising code for:
   selecting a secret master key and a plurality of public parameters including a hyperelliptic curve equation and a curve pairing function, wherein the hyperelliptic curve equation is over a finite field and is chosen such that the curve pairing function is of the form $G_1 \times G_2 \rightarrow G_T$ with $G_1$ and $G_2$ being related to the Jac(hyperelliptic curve equation, finite field) and $G_T$ being related to the finite field;
   generating a public product activation code and a private product activation code based upon the public parameters and the secret master key, wherein the private product activation code is chosen a priori as an encoding of information of N bits, and the public product activation code is derived from the private product activation code;
   storing the public parameters and the public product activation code with the product;
   associating the private product activation code with the product; and
   authenticating the product if the private product activation code entered satisfies a mathematical formula implemented with the public parameters including the hyperelliptic curve equation and the curve pairing function and the public product activation code, wherein the curve pairing function is not secret.

10. The non-transitory computer-readable storage medium of claim of 9, wherein the product is a software product purchased by a user or provided to the user and the private product activation code is provided to the user.

11. The non-transitory computer-readable storage medium of claim of 9, wherein the product is a software product and the software product and the private product activation code are transmitted to a user.

12. The non-transitory computer-readable storage medium of claim of 9, wherein the product is a storage media product that stores software that is purchased or provided to a user and the private product activation code is displayed in packaging associated with the storage media product.

13. The non-transitory computer-readable storage medium of claim of 9, wherein the private product activation code is a reduced activation code.

14. The non-transitory computer-readable storage medium of claim of 9, wherein the hyperelliptic curve equation is determined such that an efficiently computable curve pairing function is defined for the Jacobian of the curve.

15. The non-transitory computer-readable storage medium of claim of 9, wherein the secret master key is a randomly chosen number.

16. The non-transitory computer-readable storage medium of claim of 9, wherein the public product activation code is an encoding of information of 2N bits, where the level of security provided by the method is equivalent to an N-bit symmetric key.

17. A product authenticator machine comprising:
a hardware processor to implement:
a system initiator to select a secret master key and a plurality of public parameters including a hyperelliptic curve equation and a curve pairing function, wherein the hyperelliptic curve equation is over a finite field and is chosen such that the curve pairing function is of the form $G_1 \times G_2 \rightarrow G_T$ with $G_1$ and $G_2$ being related to the Jac (hyperelliptic curve equation, finite field) and $G_T$ being related to the finite field; and
a code generator to:
generate a public product activation code and a private product activation code based upon the public parameters and the secret master key, wherein the private product activation code is chosen a priori as an encoding of information of N bits, and the public product activation code is derived from the private product activation code;
store the public parameters and the public product activation code with the product; and
associate the private product activation code with the product, wherein the curve pairing function is utilized in authenticating the product and the curve pairing function is not secret.

18. The product authenticator machine of claim 17, wherein a client device including a code verifier authenticates the product if the private product activation code entered satisfies a mathematical formula implemented with the public parameters and the public product activation code.

19. The product authenticator machine of claim 17, wherein the product is a software product purchased by a user or provided to the user and the private product activation code is provided to the user.

20. The product authenticator machine of claim 17, wherein the product is a software product and the software product and the private product activation code are transmitted to a user.

21. The product authenticator machine of claim 17, wherein the product is a storage media product that stores software that is purchased or provided to a user and the private product activation code is displayed in packaging associated with the storage media product.

22. The product authenticator machine of claim 17, wherein the private product activation code is a reduced activation code.

23. The product authenticator machine of claim 17, wherein the hyperelliptic curve equation is determined such that an efficiently computable curve pairing function is defined for the Jacobian of the curve.

24. The product authenticator machine of claim 17, wherein the secret master key is a randomly chosen number.

25. A product authenticator comprising:
means for selecting a secret master key and a plurality of public parameters including a hyperelliptic curve equation and a curve pairing function, wherein the hyperelliptic curve equation is over a finite field and is chosen such that the curve pairing function is of the form $G_1 \times G_2 \rightarrow G_T$ with $G_1$ and $G_2$ being related to the Jac (hyperelliptic curve equation, finite field) and $G_T$ being related to the finite field;
means for generating a public product activation code and a private product activation code based upon the public parameters and the secret master key, wherein the private product activation code is chosen a priori as an encoding of information of N bits, and the public product activation code is derived from the private product activation code;
means for storing the public parameters and the public product activation code with the product; and
means for associating the private product activation code with the product, wherein the curve pairing function is utilized in authenticating the product and the curve pairing function is not secret.

26. The product authenticator of claim 25, wherein a client device includes means for authenticating the product if the private product activation code entered satisfies a mathematical formula implemented with the public parameters and the public product activation code.

27. The product authenticator of claim 25, wherein the product is a software product purchased by a user or provided to the user and the private product activation code is provided to the user.

28. The product authenticator of claim 25, wherein the product is a software product and the software product and the private product activation code are transmitted to a user.

29. The product authenticator of claim 25, wherein the product is a storage media product that stores software that is purchased or provided to a user and the private product activation code is displayed in packaging associated with the storage media product.

30. The product authenticator of claim 25, wherein the hyperelliptic curve equation is determined such that an efficiently computable curve pairing function is defined for the Jacobian of the curve.

31. A non-transitory computer-readable storage medium to store code executable by a computer to authenticate a product comprising code for:
reading a public product activation code and public parameters; and
authenticating the product if a private product activation code satisfies a mathematical formula implemented with the public parameters and the public product activation code, wherein the private product activation code is chosen a priori as an encoding of information of N bits, and the public product activation code is derived from the private product activation code;
wherein the public parameters include a hyperelliptic curve equation and a curve pairing function, wherein the curve pairing function is not secret,
wherein the hyperelliptic curve equation is over a finite field and is chosen such that the curve pairing function is of the form $G_1 \times G_2 \rightarrow G_T$ with $G_1$ and $G_2$ being related to the Jac(hyperelliptic curve equation, finite field) and $G_T$ being related to the finite field.

32. The non-transitory computer-readable storage medium of claim 31, wherein the product is a software product purchased by the user or provided to the user and the private product activation code is entered by the user.

33. The non-transitory computer-readable storage medium of claim 31, wherein the product is a software product and the software product and the private product activation code are transmitted to the user.

34. The non-transitory computer-readable storage medium of claim 31, wherein the product is a storage media product that stores software that is purchased or provided to the user and the private product activation code is displayed in packaging associated with the storage media product.

35. The non-transitory computer-readable storage medium of claim 31, wherein the private product activation code is a reduced activation code.

36. The non-transitory computer-readable storage medium of claim 31, wherein the hyperelliptic curve equation is determined such that an efficiently computable curve pairing function is defined for the Jacobian of the curve.

37. The non-transitory computer-readable storage medium of claim 31, wherein the public product activation code is an encoding of information of 2N bits, where the level of security provided by the method is equivalent to an N-bit symmetric key.

* * * * *